Aug. 30, 1927.
E. M. BROGDEN
1,641,112
METHOD AND APPARATUS FOR TREATING FRESH FRUIT
Filed May 15, 1922
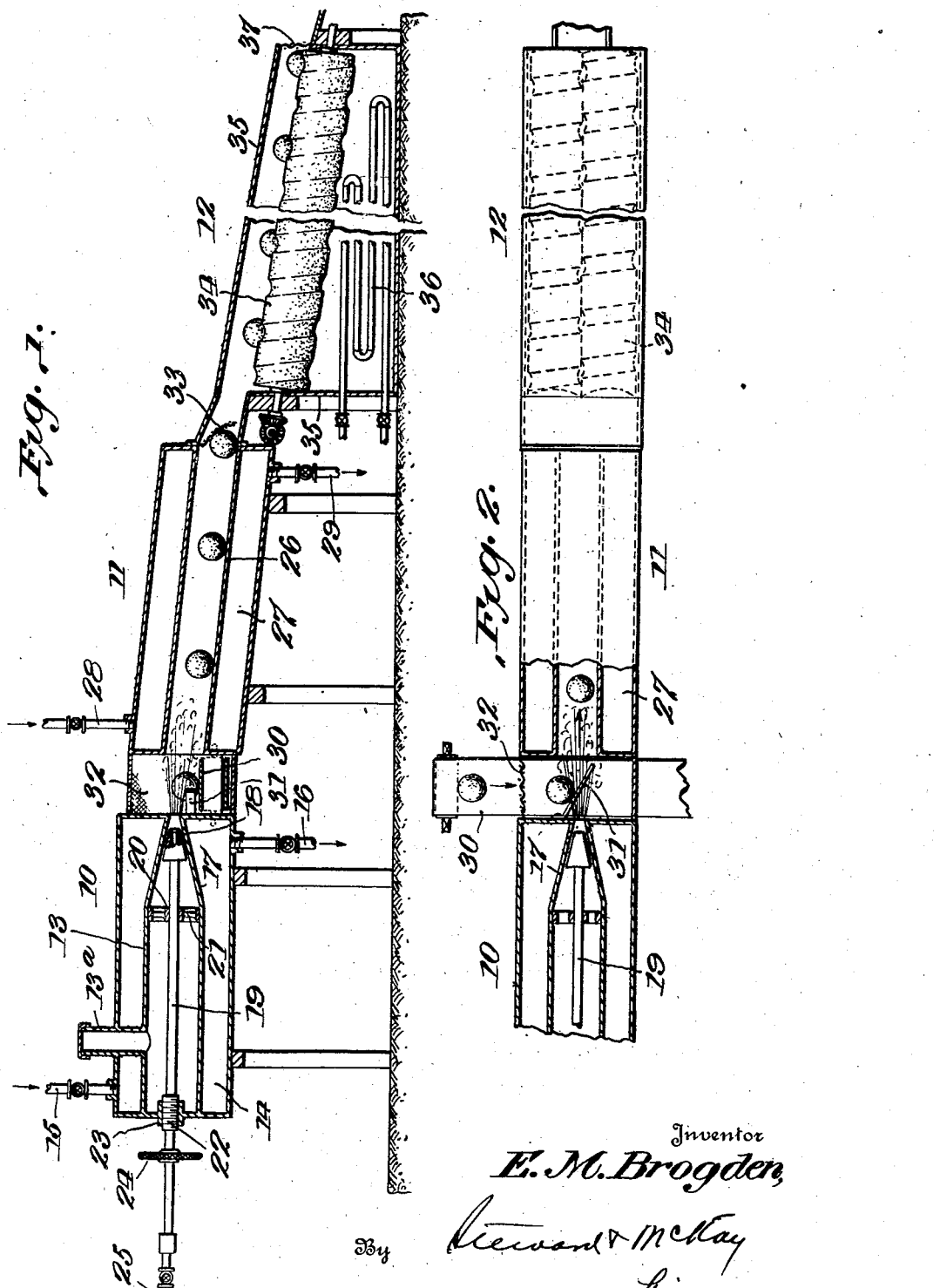
Inventor
E. M. Brogden,
By Steward & McKay
his Attorneys Patented Aug. 30, 1927.

1,641,112

UNITED STATES PATENT OFFICE.

ERNEST M. BROGDEN, OF WINTER HAVEN, FLORIDA, ASSIGNOR TO BROGDEX COMPANY, OF WINTER HAVEN, FLORIDA, A CORPORATION OF FLORIDA.

METHOD AND APPARATUS FOR TREATING FRESH FRUIT.

Application filed May 15, 1922. Serial No. 561,209.

This invention relates to methods of and apparatus for treating fresh fruits; and it has to do more particularly with the preservative coating of fresh fruit and the like with waxy or other suitable material to maintain the fruit in fresh, plump condition and to protect it against infection by mold or rot organisms as well as to attain other desirable results, as will more fully hereinafter appear.

The invention is especially useful in treating fresh fruit such as oranges, grapefruit, tangerines, lemons, apples, and the like; but it may also be extended to the treatment of cucumbers, tomatoes, cantaloupe, or other vegetable products that can profitably be treated to keep them from withering, from losing flavor and freshness, and from becoming infected. The term fruit as used herein is therefore to be understood in a sufficiently broad sense to include such vegetable products as well as fruits proper.

An important feature of the invention is the application of a normally solid preservative material to fruit by spraying it, and more particularly by atomizing or nebulizing it in liquid form in such manner as to subdivide said material so finely that it forms a mist or fog which, upon contact with the fruit, deposits upon the latter exceedingly fine particles of the material to form a thin coating. This coating can be further treated in various ways to perfect the same, and such further treatment affords important practical advantages in many instances.

In general, the preservative material or composition employed must be in liquid, or at least in reasonably fluid, condition at the time of use in order that it may be atomized or nebulized effectively.

In carrying out my invention in practice, ordinary paraffin or paraffin wax of good commercial grade melting at around 122° F. or slightly higher has been found to be a highly efficient and convenient preservative material to employ. In explaining the principles of the invention hereinafter, therefore, the use of paraffin will be more particularly referred to for the sake of a concrete example without, however, intending thereby to restrict the scope of the invention to the use of paraffin only for the purposes in view. In the specific example to be hereinafter given, it will also be assumed that the paraffin is used alone without admixture of a solvent, although the employment of a solvent is not excluded from the practice of the invention in its broader phases.

Assuming paraffin wax melting at about 122°–124° F. to be the preservative material used in accordance with the invention in preparing citrus fruit such as grapefruit, oranges or lemons, for market, the pure paraffin, that is, without a solvent, is melted in any suitable manner and maintained in properly fluent molten condition by the application of heat, and while in this condition is atomized or nebulized with the aid of compressed air in such manner as to form a fine mist or fog which is made to contact with the fruit to be treated under proper conditions and environment to produce thereon a thin protective coating of paraffin. The fruit is also subjected to the rubbing and polishing action of suitable rubbing mechanism such, for example, as the well known revolving brush-roll polisher apparatus commonly used in the fruit packing industry; and this rubbing or polishing action on the fruit may be effected simultaneously with the application of the paraffin coating thereto, or it may be effected as a subsequent step after the paraffin coating has been so applied. In either case, the treatment accorded the fruit in conformity with the principles of the invention comprises effecting contact of a very fine spray, mist or fog of paraffin with fruit and subjecting the fruit to a rubbing or polishing action to spread the paraffin deposit as uniformly as possible all over the surface of the fruit.

A mist or fog of paraffin best suited for the practice of the invention can be most conveniently produced by means of an atomizing or nebulizing apparatus in which the molten paraffin, maintained at about say 150° F., is acted upon by compressed air at any pressure suitable to properly atomize or nebulize the same. In some cases the air may be used advantageously at a pressure of say 125 to 150 pounds per square inch. Various specific types of apparatus suitable for this purpose, among which is the so-called air-brush, are obtainable commercially, and the practice of the invention is not limited to any specific construction thereof, although a typical construction that can be used to advantage is hereinafter described by way of a concrete example. The mist or fog produced by the use of a compressed gas is readily distinguishable in character and effect from a mere spray produced by pumping the liquid protective material directly through a rose or spray-head, and affords decidedly greater advantages.

It is desirable to bring about contact of the paraffin mist or fog with the fruit in a warm environment, most desirably at a temperature higher or not materially lower than the melting point of the paraffin employed. This condition is desirable to observe in order to favor deposit of the paraffin on the fruit in the form of a continuous thin film-like coating. By thus effecting the contact of the mist or fog with the fruit in a heated environment, not only is congelation or solidification of the fine paraffin particles of the mist or fog prevented before they strike the surface of the fruit, but the surface of the fruit itself is warmed appreciably and hence, if there is any tendency for the paraffin particles to congeal or solidify when they strike the fruit surface, this tendency is very much less than it would be in an unheated environment, and the thin coating of paraffin deposited on the fruit remains in any case sufficiently soft and fluent in the heated environment to render it spreadable by polisher brushes or otherwise. It is not to be understood, however, that the invention is limited in its broader aspects to the employment of a heated environment in this connection; for while this is desirable, it is nevertheless possible to contact the paraffin mist or fog with the fruit under ordinary atmospheric temperature conditions and still obtain a paraffin coating that enables the benefits of the invention to be realized to at least some extent, especially where the misting of the fruit on the paraffin is accompanied either simultaneously or subsequently by proper treatment of the fruit with the aid of efficient polisher or brushing apparatus.

In order to afford a full understanding of the principles of the invention, as regards both process and apparatus, a specific example will now be given illustrating one way in which the novel process may be practiced in treating citrus fruit with the aid of a desirable form of novel apparatus also embodying the principles of the invention. The apparatus referred to is shown more or less diagrammatically in the accompanying drawings, in which Fig. 1 is a side view in elevation, partly in central longitudinal section, and Fig. 2 is a plan view, also partly in section.

Referring to the drawings, the particular form of apparatus therein shown for the purposes of illustration comprises atomizer or nebulizer apparatus indicated generally at 10, a heated coating unit 11 in which the paraffin mist or fog and fruit are brought into contact, and fruit rubbing or polishing means 12 to which fruit is delivered from the unit 11.

The atomizer or nebulizer unit 10 comprises in this instance a container or receptacle 13 for molten paraffin, said container having a filling or supply tube 13ª and being surrounded by a steam or hot water jacket 14, which is provided with a valved inlet 15 for admission of the heating fluid into the heating jacket and a valved outlet 16. The paraffin container 13 is provided with a tapered discharge nozzle 17, the nozzle opening being controlled by a needle or cone valve 18 carried by a valve stem 19, which latter consists of a small bore tube slidably and rotatably guided and supported near the valve 18 in a bearing 20 carried by the supporting spider 21. The valve rod 19 extends through the opposite end wall of the jacket 14, the rod being provided with an exteriorly threaded enlargement 22 working in a threaded stationary bushing 23 in the wall of the heating jacket. By means of a suitable controlling handle 24, which is fast with the sleeve 22 and rod 19, the position of the valve 18 may be adjusted to entirely close the nozzle outlet of the container 13 or to maintain any desired size of outlet for discharge of molten paraffin therefrom. Through a valved supply pipe 25, compressed air at any desired pressure may be supplied to tube 19 to provide a jet of air which, acting like an injector, atomizes molten paraffin that flows out through the nozzle end of container 13.

The mist or fog of paraffin obtainable by proper operation of the atomizer or nebulizer 10 is directed into the upper end of a slightly inclined elongated chamber or enclosed runway 26, which is heated by a steam jacket or the like 27, said jacket being provided with valved inlet 28 and valved outlet 29 for the heating medium. The fruit to be treated is also introduced in any suitable manner into the upper end of the elongated chamber or runway 26. In the particular arrangement here shown, the coating unit 11 is spaced away slightly from the discharge nozzle of the nebulizer 10 to permit convenient introduction of the fruit to be treated into the upper end of the chamber 26. As here shown, the fruit to be treated is carried by a transversely extending conveyor belt 30 into the space between the nebulizer unit 10 and the apparatus unit 11. At 31 is a stationary deflector member arranged at such an angle in the path of the advancing fruit that the fruit is shunted off the conveyor belt and into the upper end of the chamber 26, whereupon it progresses toward the lower end of the inclined chamber at a speed depending upon the inclination thereof. The space between the apparatus units 10 and 11 is suitably enclosed to prevent substantial escape of the paraffin mist or fog, that part of the closure indicated at 32 in the path of the advancing fruit consisting in this instance of a suspended flexible curtain or flap of canvas or the like which yields to permit the successive pieces of fruit to be carried into the aforesaid space by the conveyor belt. As the fruit moves toward the lower end of the chamber 26, it rolls over and over and its entire surface is exposed to contact with the paraffin mist or fog so that a thin film coating of paraffin is produced on the fruit. The temperature in this chamber should be maintained as warm as is safe, having in view the sensitiveness of the fruit to heat, the length of time of travel through the chamber and the other essential factors involved in the operation. In general, the length of the chamber, the temperature maintained therein, and the other conditions mentioned, should be such as not to produce any substantial increase in the temperature of the main mass or body of the fruit; but a superficial or surface warming of the fruit is not objectionable and is even advantageous, as before pointed out, as tending to prevent too rapid or complete solidification of the paraffin coating. A temperature of around 150° F. in the chamber 26 is usually suitable. The fruit makes its exit from the lower end of chamber 26 by pushing aside the depending flap 33 of canvas or the like guarding the chamber exit, and then rolls down upon the horse-hair polisher brushes 34 which may be of the usual long cylindrical type revolubly mounted in parallel to cooperate in pairs to provide one or more fruit runways, the rolls being slightly inclined from the horizontal so that the fruit moves down the runway or runways gradually and is delivered from the lower end thereof to other fruit packing apparatus such as grader belts and sizers (not shown). During its passage down the runway or runways provided by the polisher rolls 34, the fruit is turned over and over by the revolving brushes so that it rotates rapidly on different axes and is subjected to a thorough rubbing and brushing action that serves to spread the paraffin coating over the fruit and render the coating more uniform in thickness. If desired, the polisher rolls may be enclosed in a suitable housing or other covering means indicated conventionally at 35; and steam coils 36 or other appropriate heating means may be provided to warm the atmosphere around said rolls to an extent sufficient to maintain the paraffin coating on the fruit soft or even substantially liquid and thus facilitate its being spread in a thin film all over the fruit. It is advantageous to locate the heating means just below the polisher rolls, as here illustrated. Where the polisher rolls are housed as here indicated, the fruit is delivered from the lower end of the rolls through one or more suitable apertures in the housing, each guarded by a flexible flap 37, similar to flap 33. It is to be noted that the paraffin mist or fog produced in the manner described is rather persistent in character, with the result that a substantial portion thereof passes clear through unit 11 and into the polisher housing 35, the fruit being thus exposed to contact with said mist or fog while passing down the polisher runways.

The fruit delivered to the mist or fog chamber 26 by the conveyor belt 30 has ordinarily been subjected to a preliminary cleansing treatment of some kind to remove adherent dirt and other foreign matter. It may for example have passed through the usual fruit washer and then through a drier to remove excess moisture; or it may have been subjected to other cleansing treatment not involving the use of water at all. In any case, the preservative paraffin coating applied to the fruit in accordance with the principles of the invention as exemplified in the foregoing specific example, has the effect of enhancing the keeping qualities of the fruit by precluding infection from the exterior, and it prevents or substantially reduces withering and shrinkage, thus permitting shipment of the treated fruit and receipt thereof in distributing markets in firm, plump condition and with substantially unimpaired flavor and freshness.

It will be observed from the foregoing description that, in general, the novel process of the invention in the specific illustrative embodiment described herein, involves exposing fruit to contact with atomized or nebulized paraffin or other suitable preservative material and thoroughly rubbing or polishing the fruit so exposed; also that the novel apparatus of the invention involves essentially some kind of atomizing or nebulizing means in operative association with rubbing or polishing means. In the particular embodiments of the novel process and apparatus herein selected to illustrate the principles underlying the invention, the initial contact of the fruit with the paraffin mist or fog occurs before the fruit is delivered to the brushing rolls; but it is to be understood that such initial contact may, within the scope of the broad invention, occur when the fruit is on the brushing rolls. In such case the apparatus unit 11 may be omitted and the atomizer or nebulizer arranged to discharge directly upon the rolls 34 of the polisher 12, which rolls may be enclosed in a suitable housing and also heated, as hereinabove pointed out.

What I claim is:

1. The process of treating fresh fruit which comprises subjecting fresh fruit to the action of revolving polisher brush rolls cooperating to provide a runway along which the fruit is caused to travel, while atomizing a fluid protective material in operative proximity to said fruit and brush rolls to effect contact of said material therewith.

2. The process of treating fresh fruit which comprises subjecting fresh fruit to the action of revolving polisher brush rolls cooperating to provide a runway along which the fruit is caused to travel, while atomizing paraffin in fluid condition in operative proximity to said fruit and brush rolls to effect contact of said material therewith.

3. The process of treating fresh fruit which comprises producing a mist or fog of a preservative material containing paraffin, moving the fruit in contact with said mist or fog, and rubbing the fruit.

4. The process of treating fresh fruit which comprises atomizing paraffin in fluid condition to produce a mist or fog in contact with the fruit, and rubbing the fruit while the paraffin is still soft.

5. The process of treating fresh fruit which comprises spraying substantially pure molten waxy material upon fruit, and rubbing the fruit.

6. The process of treating fresh fruit which comprises spraying substantially pure molten paraffin upon the fruit, and rubbing the fruit while the paraffin is still soft.

7. The process of treating fresh fruit which comprises exposing the same to contact with atomized preservative material while rubbing the fruit.

8. The process of treating fresh fruit which comprises subjecting the same to the action of revolving brush rolls while exposed to a mist of paraffin.

9. The process of treating fresh fruit which comprises exposing fruit to contact with a mist of paraffin-containing material, while turning said fruit rapidly over and over and rubbing the same.

10. The process of treating fresh fruit which comprises applying paraffin-containing material in warm fluent condition to fresh fruit, and distributing it over the fruit by thoroughly rubbing while said material is still warm.

11. The process of treating fresh fruit which comprises applying to fresh fruit substantially pure paraffin in heated condition and rubbing the fruit thoroughly to spread the paraffin thereover in a thin film.

12. Apparatus for treating fruit or the like which comprises the combination, with mechanism for rubbing or brushing fruit and for automatically discharging the same after acting upon it, of means arranged to deliver fruit to said mechanism, and means for atomizing or nebulizing protective material into contact with said fruit as it passes through the apparatus and before it is discharged from said mechanism.

13. Apparatus for treating fruit or the like which comprises the combination, with revoluble brush-roll mechanism, of means for atomizing or nebulizing protective material into contact with fruit being treated by said mechanism, said means including a receptacle for liquid protective material, provision for heating said receptacle, and a compressed air nozzle device supplied with liquid material from said receptacle.

14. Apparatus for treating fruit or the like which comprises the combination, with inclined fruit-polisher rolls, of a spray device operatively adjacent said polisher rolls and arranged to discharge in operative proximity to same, said device including a container for molten paraffin or the like, means for heating said container, and compressed air means for spraying the molten paraffin.

15. Apparatus for treating fruit or the like which comprises the combination, with revoluble brush-roll mechanism, of an enclosed runway arranged to deliver fruit thereto, means for feeding fruit into said runway, and means for introducing preservative material into said runway for contact with fruit therein.

16. Apparatus for treating fruit or the like which comprises the combination, with revoluble brush-roll mechanism, of an enclosed runway arranged to deliver fruit thereto, means for heating said enclosed runway, means for feeding fruit into said runway, a device arranged to direct a spray of preservative material into said runway, and means for heating such spray device.

17. The process of coating fruit with paraffin which comprises spraying melted paraffin on the fruit, and polishing the fruit until the paraffin forms a continuous coating over the entire surface of the fruit.

18. The process of coating fruit with paraffin which comprises spraying melted paraffin on the fruit while concurrently rubbing the fruit until the paraffin forms a continuous coating over the entire surface of the fruit.

19. The process of enhancing the appearance and keeping qualities of fruit comprising coating the surface of the fruit with a melted waxy material, and then subjecting the fruit to friction to spread the material evenly thereon.

20. The method of preserving fruit which consists in passing the same through a relatively closed heated chamber, applying to the surface of the fruit while passing therethrough a coating of heated liquid preservative, subjecting the fruit immediately after the application of the preservative coating thereto to the action of polishing elements for the distributing of the preservative over the surface thereof and the polishing of the surface of the fruit.

21. The process of treating fresh fruit which comprises spraying fluid waxy material upon the fruit, and rubbing the fruit while in a heated environment to spread the material uniformly thereover.

22. The method of preserving fruit which consists in conveying the same through a chamber maintained at a temperature sufficiently high to soften paraffin, depositing molten paraffin on the surface of the fruit while the fruit is passing through said chamber, and subjecting the fruit to a brushing action before discharging it from the chamber.

23. The method of preserving fruit which consists in passing the same through a relatively closed chamber and, prior to discharging the same therefrom and during its passage therethrough, applying to its surface a coating of liquid paraffin and subjecting the coated fruit to a polishing action to polish the surface, all of said operations taking place while the interior of said chamber is maintained at a temperature sufficiently high to melt the paraffin.

24. The method of preserving fruit, which consists in applying to the surface thereof paraffin and rubbing the fruit to spread the paraffin thereover in a film coating, while the surface of the fruit is maintained at a temperature above atmospheric.

25. The process of treating fresh fruit which comprises producing a spray of a preservative material containing paraffin, and moving the fruit in contact with said spray while at the same time rubbing the fruit.

26. The process of treating fresh fruit which comprises exposing the same to contact with a spray of preservative material while rubbing the fruit.

27. The process of treating fresh fruit which comprises exposing fruit to contact with a spray of paraffin-containing material, while turning said fruit over and over and rubbing the same.

28. The process of treating fresh fruit which comprises applying to fresh fruit substantially pure paraffin in heated condition, while rubbing the fruit thoroughly to spread the paraffin thereover in a thin film.

29. Apparatus for treating fruit or the like which comprises the combination, with mechanism for rubbing or brushing fruit and for automatically discharging fruit after acting upon it, of means arranged to deliver fruit to said mechanism, a spray device operatively adjacent said mechanism and arranged to discharge material in operative proximity thereto, said device including a container for liquid protective material and compressed air means for spraying the same, and heating means adjacent said rubbing or brushing mechanism.

30. Apparatus for treating fruit or the like which comprises the combination, with revoluble brush rolls providing a fruit runway, of a spray device, including a container for liquid material and compressed air means for spraying said material, arranged operatively adjacent said rolls, and heating means subadjacent said rolls.

31. Apparatus for treating fruit comprising rubbing means that provides a runway for fruit, in combination with means for supplying fluid coating material, and compressed-air spray means supplied therefrom and mounted to direct spray upon said runway.

32. Apparatus for treating fruit comprising rotary brush roll mechanism providing a fruit runway that extends parallel to the brush roll axis, and an air-brush device mounted operatively adjacent said runway to direct a spray of liquid material upon fruit passing along said runway.

In testimony whereof I hereunto affix my signature.

ERNEST M. BROGDEN.